United States Patent [19]

Kan et al.

[11] Patent Number: 4,558,088

[45] Date of Patent: * Dec. 10, 1985

[54] COMPOSITION FOR CARCASS OF TIRE

[75] Inventors: Masanori Kan, Amagasaki; Takuya Okazaki, Toyonaka; Tatsuo Sakashita, Suita, all of Japan

[73] Assignee: The Toyo Rubber Industry Co., Ltd., Osaka, Japan

[ * ] Notice: The portion of the term of this patent subsequent to Nov. 22, 2000 has been disclaimed.

[21] Appl. No.: 389,688

[22] Filed: Jun. 18, 1982

[30] Foreign Application Priority Data

Jun. 24, 1981 [JP] Japan .................................. 56-98628

[51] Int. Cl.⁴ .......................... C08K 5/01; C08L 9/06; C08L 7/00; C08L 53/02
[52] U.S. Cl. ...................................... 524/505; 525/99
[58] Field of Search .................. 525/99, 250; 524/575, 524/505

[56] References Cited

U.S. PATENT DOCUMENTS

| | | | |
|---|---|---|---|
| 3,686,365 | 8/1972 | Sequeira | 525/250 |
| 4,248,981 | 2/1981 | Milkovich et al. | 525/250 |
| 4,346,193 | 8/1982 | Warfel | 525/250 |
| 4,417,027 | 11/1983 | Kan et al. | 525/99 |

*Primary Examiner*—Allan M. Lieberman
*Attorney, Agent, or Firm*—Koda and Androlia

[57] ABSTRACT

A carcass rubber composition for tires comprising a polymer blend of diene synthetic elastomer and natural rubber. Said diene synthetic elastomer contains a solution polymerization star shaped SBR, preferably, in the ratio of 20–50 percent. 1, 2 structure in the butadiene unit is preferably less than 50 percent. The styrene content is preferably 10–20 percent.

1 Claim, No Drawings

COMPOSITION FOR CARCASS OF TIRE

BACKGROUND OF THE INVENTION

1. Field of the Invention

This invention relates to a durable composition for tire carcass which is composed of polymer blend suitable for preventing separation at the ends of turn-ups of carcass reinforcing cords in tires for automobiles.

2. Prior Art

The conventional rubber polymers used for carcass cords are generally natural rubber (ab. NR) or blend of natural rubber and butadiene rubber (ab. BR). But the degree of the penetration of said polymers into carcass ply cords is low. The addition of a lot of softeners or adhesives for covering said defect results in the deterioration of properties of said polymers. Thus there have not been obtained the integral structure of carcass ply cords and rubber polymers. Consequently, under high-frequency vibration inevitable to automobile tires, cracks in rubber polymers are induced by the concentration of stress at the interfaces between the filaments of carcass ply cords and said rubber polymers, by flex fatigue of the rubber polymers or by the deterioration of adhesive properties. And the growth of said cracks causes the separation failure. Thus, it can be said that considerations have not been taken into consideration when adapting rubber polymers to carcass ply cords.

SUMMARY OF THE INVENTION

It is an object of the present invention to provide a carcass rubber composition having high adaptability to carcass ply cords and to prevent the occurrence of cracks and separation failure. For a carcass rubber composition, consideration should be taken into such elements as the penetrability into and the tackiness to carcass ply cords, the mechanical fatigue performance and the degree of the reversion in vulcanization of rubber polymers. The inventors have made various investigations and experiments to find out a highly adaptable composition and consequently have found that a polymer blend containing solution polymerization star shaped SBR is most suitable to a carcass rubber composition.

DETAILED DESCRIPTION OF THE INVENTION

The embodiments of the carcass rubber composition according to the present invention will now be described in detail with reference to the following Tables.

Tables 1 and 2 show the results of comparison tests of the properties between the carcass rubber compositions comprising general-purpose rubber polymers and the carcass rubber compositions comprising the specific rubber materials, namely rubber polymers blended with solution polymerization star shaped SBR according to the present invention.

In Table 2, the effects of the change of the micro structure of star shaped polymer, namely, the effects of the content of 1, 2 structure in the butadiene unit are compared.

TABLE 1

| | Carcass Composition (1) | | | | | | |
|---|---|---|---|---|---|---|---|
| | Parts by Weight | | | | | | |
| | General-purpose rubber | | Embodiments | | | | |
| | | | Composition No. | | | | |
| | 1 | 2 | 3 | 4 | 5 | 6 | 7 |
| Component | | | | | | | |
| NR | 70 | 80 | 40 | 60 | 50 | 70 | 70 |
| BR | 20 | 20 | | | 10 | | 20 |
| SBR-1500 | 10 | | | | 10 | | |
| Star shaped SBR*[1] | | | 60 | 40 | 30 | 30 | 10 |
| ZnO | 3 | 3 | 3 | 3 | 3 | 3 | 3 |
| Stearic acid | 2 | 2 | 2 | 2 | 2 | 2 | 2 |
| Carbon (HAF) | 50 | 50 | 50 | 50 | 50 | 50 | 50 |
| Naphthenic oil | 15 | 15 | 15 | 15 | 15 | 15 | 15 |
| Accelerator (CZ) | 1.2 | 1.2 | 1.2 | 1.2 | 1.2 | 1.2 | 1.2 |
| S | 1.8 | 1.8 | 1.8 | 1.8 | 1.8 | 1.8 | 1.8 |
| Test item | | | | | | | |
| Compression fatigue performance (number of cracks in average)*[2] | 51 | 45 | 9 | 10 | 17 | 15 | 39 |
| Durability of turn-ups of cords (length of time)*[3] | 150 | 160 | 200 | 200 | 200 | 200 | 180 |
| Resulting condition of turn-ups of cords | Separation | Separation | No damage | No damage | No damage | No damage | Separation |
| Tackiness (g)*[4] | 850 | 900 | 400 | 780 | 760 | 880 | 830 |

TABLE 2

| | Carcass Composition (2) | | | | | |
|---|---|---|---|---|---|---|
| | Parts by Weight | | | | | |
| | Composition No. | | | | | |
| | 8 | 9 | 10 | 11 | 12 | 13 |
| Component | | | | | | |
| NR | 50 | 50 | 70 | 70 | 70 | 50 |

TABLE 2-continued

| | Carcass Composition (2) | | | | | |
|---|---|---|---|---|---|---|
| | Parts by Weight Composition No. | | | | | |
| | 8 | 9 | 10 | 11 | 12 | 13 |
| Star shaped SBR | 50 | 50 | 30 | 30 | 30 | 50 |
| Content of styrene (weight percentage) | 5 | 10 | 15 | 15 | 20 | 30 |
| Content of 1, 2 structure in butadiene unit (weight %) | 40 | 45 | 65 | 75 | 45 | 50 |
| ZnO | 3 | 3 | 3 | 3 | 3 | 3 |
| Stearic acid | 2 | 2 | 2 | 2 | 2 | 2 |
| Carbon | 50 | 50 | 50 | 50 | 50 | 50 |
| Naphthenic oil | 15 | 15 | 15 | 15 | 15 | 15 |
| Accelerator (CZ) | 1.2 | 1.2 | 1.2 | 1.2 | 1.2 | 1.2 |
| S | 1.8 | 1.8 | 1.8 | 1.8 | 1.8 | 1.8 |
| Test item | | | | | | |
| Compression fatigue performance (number of cracks inaverage)*2 | 4 | 9 | 28 | 33 | 13 | 27 |
| Durability of turn-ups of cords (length of time)*3 | 240 | 200 | 180 | 180 | 200 | 180 |
| Resulting condition of turn-ups of cords | No damage | No damage | Separation | Separation | No damage | Separation |
| Reversion in vulcanization (at 180° C. for 30 minutes) | occurred | not occurred | not occurred | not occurred | not occurred | |

Note:
NR — Natural rubber
BR — Butadiene rubber
SBR-1500 — Emulsion polymerization styrene-butadiene rubber, styrene bond content is 23.5 percent by weight.
*1Solution polymerization star shaped styrene-butadiene rubber. The content of 1, 2 structure in the butadiene unit is 45 percent by weight, styrene content is 15 percent by weight.
*2Compression fatigue performances were measured by a compression fatigue performance testing machine in Goodrich style. 20 samples were prepared by embedding one dipped cord (polyester cord 1000d/2) into each of rubber pieces of standard size (76.2 mm × 11.1 mm × 12.7 mm). A comparison was made according to the number of cracks which occured between rubbers and cords after having the samples compressed and extended 3,6000,000 times under the compression ratio of 12.5% and the extension ratio of 6.5%.
*3The durability test of the turn-ups of carcass ply cords was conducted upon tires of 185/70 SR 14 in size employing the carcass rubber compositions according to Table 1 in accordance with the provisions of durability of JIS. D 4230-1978. The durability was measured by comparing the length of time until separation occurred under such loading conditions. As first, a load of 115% for 24 hours and second a load of 140% for 24 hours and last a load of 160% for 24 hours. (The test was stopped at 200 hours.)
*4Tackiness was measured with an autographic tack meter (pick-up method) as to the peeling force (g) with the contact load of 1,000 g for one minute and the peeling speed of 5 mm/min.

As apparent from Table 1, the number of cracks of the conventional tires employing the general-purpose rubber compositions No. 1 and No. 2 was 51 and 45 respectively, but on the contrary, the number in cracks of the tire which contains only 10% of the solution polymerization star shaped SBR was reduced to 39 as shown in the composition No. 7. It can also be understood that the number of cracks decreases more with the increase of the content of the solution polymerization star shaped SBR.

In the durability test of the carcass turn-ups, the general tires employing general-purpose rubber compositions No. 1 and No. 2 caused separation failure at 150 and 160 hours respectively. But, the tire employing the composition No. 7 causes no separation up to the lapse of 180 hours. Besides, the results show that no separation occurs with the increase of the content of the solution polymerization star shaped SBR.

It can be said that the more solution polymerization star shaped SBR contained in a rubber composition, the degree of penetration of the rubber composition into the carcass ply cords becomes better owing to the good flow ability and also the better the reversion property is. Accordingly, the more solution polymerization star shaped SBR contained, the less deterioration of the rubber composition is caused by reversion in the vulcanization and the rubber composition has a good property. But if the content ratio of solution polymerization star shaped SBR is over 60%, the tackiness is liable to decrease suddenly, so that the adhesion property of rubber compositions decreases with each other, for example, inner liner rubber with carcass rubber, carcass rubber with itself and carcass rubber with side wall rubber. Accordingly, the preferable ratio of the content of the solution polymerization star shaped SBR in the rubber composition is in the range of 20–50%.

As shown further in Table 2, the carcass rubber compositions Nos. 8, 9 and 12 containing 40–45 percent by weight of 1, 2 structure in the butadiene unit in the star shaped styrene-butadiene rubber (SBR) is preferable since the number of cracks caused by the compression fatigue is only 4–13. But the carcass rubber compositions Nos. 10, 11 and 13 containing more than 50 percent by weight of 1, 2 structure in the butadiene unit, the number of cracks increases to 27–33. Similar results occurred in the durability of the turn-ups of the cords. Accordingly, it would be necessary to make the content of 1, 2 structure in the butadiene unit less than 50 percent by weight.

With regard to the styrene content in SBR, the compression fatigue resistance and the durability of the turn-ups of the cords tend to deteriorate with the increase of the content thereof. High durability is obtained when the styrene content is less than 20 percent by weight. On the other hand, if the styrene content is too little, reversion of the rubber compostion in vulcanization easily occurs, so that approximately more than 10 percent by weight of styrene content is preferable. Then, the styrene content in the star shaped SBR is preferable approximately in the range of 10–20 percent by weight.

In a pneumatic tire, the concentration of stress is apt to occur especially at the ends of turn-ups of carcass ply cords so that they are usually subjected to damages. But said disadvantage is improved by blending the star shaped SBR in rubber compositions. Because, as the flow-ability of the rubber composition becomes good, the penetrability into the carcass cords is improved so that no voids are retained in the carcass ply cords. Thus, the concentration of stress is eliminated. And further since said composition enjoys good fatigue resistance, the occurrence of separation and cracks are effectively prevented. The general-purpose rubber deteriorates the properties owing to the reversion in vulcanization at a high temperature and short time vulcanization as conducted for a passenger car tire, while the property of the composition containing the star shaped SBR does not deteriorate under the same condition. Thus, various deficiencies are settled and the durability of tires is much increased by using the polymer blend according to the present invention.

We claim:

1. A carcass rubber composition for tires comprising:
a polymer blend of diene synthetic elastomer and natural rubber, said diene synthetic elastomer containing a solution polymerization star shaped SBR, said solution polymerization star shaped SBR comprising 20–50 percent of said rubber composition and the content of 1,2 structure in the butadiene unit is less than 50 percent and the styrene content is 10–20 percent in the micro structure of said solution polymerization star shaped SBR; and
naphthenic oil whereby a carcass rubber composition with high penetration of and tackiness to carcass ply cords is provided.

* * * * *